United States Patent
Xu et al.

(10) Patent No.: US 9,398,585 B2
(45) Date of Patent: Jul. 19, 2016

(54) METHODS AND APPARATUS FOR PROXIMITY DETECTION

(71) Applicant: QUALCOMM Incorporated, San Diego, CA (US)

(72) Inventors: Hao Xu, San Diego, CA (US); Peter Gaal, San Diego, CA (US); Zhifei Fan, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 13/664,865

(22) Filed: Oct. 31, 2012

(65) Prior Publication Data

US 2013/0114450 A1  May 9, 2013

Related U.S. Application Data

(60) Provisional application No. 61/556,783, filed on Nov. 7, 2011.

(51) Int. Cl.
  *H04W 72/08* (2009.01)
  *H04W 72/04* (2009.01)

(52) U.S. Cl.
  CPC ................................ *H04W 72/0426* (2013.01)

(58) Field of Classification Search
  CPC ................................................ H04W 72/0426
  See application file for complete search history.

(56) References Cited

U.S. PATENT DOCUMENTS

| | | | |
|---|---|---|---|
| 7,778,151 B2 | 8/2010 | Bertrand et al. | |
| 7,933,566 B2 | 4/2011 | Li et al. | |
| 8,181,079 B2 | 5/2012 | Gorokhov et al. | |
| 8,315,148 B2 | 11/2012 | Lipka et al. | |
| 2004/0062218 A1 | 4/2004 | Ue | |
| 2008/0261645 A1 | 10/2008 | Luo et al. | |
| 2008/0267303 A1 | 10/2008 | Baldemair et al. | |
| 2009/0022173 A1 | 1/2009 | Horn et al. | |
| 2009/0197631 A1 | 8/2009 | Palanki et al. | |

(Continued)

FOREIGN PATENT DOCUMENTS

| | | |
|---|---|---|
| CN | 1195435 A | 10/1998 |
| JP | 2010514298 A | 4/2010 |

(Continued)

OTHER PUBLICATIONS

Partial International Search Report and Written Opinion—PCT/US2012/062923—ISA/EPO—Feb. 8, 2013.

(Continued)

*Primary Examiner* — John Blanton
(74) *Attorney, Agent, or Firm* — Patterson & Sheridan, L.L.P.

(57) ABSTRACT

Certain aspects of the present disclosure provide methods, apparatus, and computer-program products for the detection of potentially interfering or interfering user equipment (UE) in the proximity of a detecting entity. The detecting entity may be a base station or a UE. In an aspect, the proposed detecting scheme utilizes semi-static system information from one or more neighboring base stations (BSs), and identifies a neighbor BS's UE that causes interference in the physical uplink control channel (PUCCH). The proposed detecting scheme may also identify corresponding resources that are allocated to an interfering UE by the interfering neighbor base station. In aspects, detecting schemes may not utilize information from one or more neighboring BSs.

30 Claims, 9 Drawing Sheets

(56) References Cited

U.S. PATENT DOCUMENTS

| | | |
|---|---|---|
| 2009/0225741 A1 | 9/2009 | Wang et al. |
| 2009/0252077 A1 | 10/2009 | Khandekar et al. |
| 2009/0325626 A1 | 12/2009 | Palanki et al. |
| 2010/0008282 A1 | 1/2010 | Bhattad et al. |
| 2010/0056197 A1 | 3/2010 | Attar et al. |
| 2010/0074130 A1 | 3/2010 | Bertrand et al. |
| 2010/0206154 A1 | 8/2010 | Aletto et al. |
| 2010/0216470 A1 | 8/2010 | Pamp et al. |
| 2010/0238888 A1 | 9/2010 | Sampath et al. |
| 2011/0044269 A1* | 2/2011 | Fan ............... H04B 1/7105 370/329 |
| 2011/0085448 A1* | 4/2011 | Kuwahara ......... H04W 16/10 370/242 |
| 2011/0103286 A1* | 5/2011 | Montojo et al. .............. 370/312 |
| 2011/0105135 A1* | 5/2011 | Krishnamurthy ..... H04W 16/10 455/450 |
| 2011/0151907 A1* | 6/2011 | Oh ................. H04W 72/0426 455/501 |
| 2011/0170440 A1* | 7/2011 | Gaal et al. .................... 370/252 |
| 2011/0235602 A1 | 9/2011 | Ji et al. |
| 2011/0250911 A1* | 10/2011 | Xu et al. ....................... 455/501 |
| 2011/0275381 A1* | 11/2011 | Moberg ............ H04W 72/0406 455/450 |
| 2012/0008511 A1 | 1/2012 | Fan et al. |
| 2012/0113831 A1* | 5/2012 | Pelletier ................ H04L 5/0058 370/252 |
| 2012/0142364 A1 | 6/2012 | Duan |
| 2012/0243503 A1 | 9/2012 | Mochida |

FOREIGN PATENT DOCUMENTS

| | | |
|---|---|---|
| JP | 2011109473 A | 6/2011 |
| WO | WO-2008074801 A1 | 6/2008 |
| WO | WO-2009012322 A2 | 1/2009 |
| WO | WO-2009039404 | 3/2009 |
| WO | WO-2009099813 A1 | 8/2009 |
| WO | WO2009121010 A2 | 10/2009 |
| WO | WO2009155967 A1 | 12/2009 |
| WO | 2011021387 A1 | 2/2011 |
| WO | 2011090028 A1 | 7/2011 |
| WO | WO-2011085395 A1 | 7/2011 |
| WO | WO-2011085399 A1 | 7/2011 |

OTHER PUBLICATIONS

PicoChip Designs,Text Proposal for TR36.9xx: Victim UE Aware Interference Management,3GPP TSG-RAN WG4 Meeting #53 R4-094821,Nov. 2009,URL,http://www.3gpp.org/ftp/tsg_ran/wg4_radio/TSGR4_53/Documents/R4-094821.zip.

PicoChip Designs,Victim UE Aware Downlink Interference Management,3GPP TSG-RAN WG4 Meeting #52bis R4-093668,Oct. 12, 2009,URL,http://www.3gpp.org/ftp/tsg_ran/wg4_radio/TSGR4_52bis/Documents/R4-093668.zip.

PicoChip Designs,Victim UE Aware Downlink Interference Management,3GPP TSG-RAN WG4 Meeting #53 R4-094367,Nov. 9, 2009,URL,http://www.3gpp.org/ftp/tsg_ran/wg4_radio/TSGR4_53/Documents/R4-094367.zip.

International Search Report and Written Opinion—PCT/US2012/062923—ISA/EPO—Apr. 11, 2013.

* cited by examiner

METHODS AND APPARATUS FOR PROXIMITY DETECTION

CLAIM OF PRIORITY UNDER 35 U.S.C. §119

The present Application for Patent claims priority to U.S. Provisional Application No. 61/556,783, entitled, "Method and Apparatus for Proximity Detection," filed Nov. 7, 2011, and assigned to the assignee hereof and hereby expressly incorporated by reference herein.

BACKGROUND

1. Technical Field

The present disclosure relates generally to wireless communications, and more specifically to detecting and/or managing interference in wireless networks.

2. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data to one or more UEs on the downlink and may receive data from one or more UEs on the uplink. On the downlink, a data transmission from the base station may observe interference due to data transmissions, for example, from neighbor base stations. On the uplink, a data transmission from a UE may observe interference due to data transmissions, for example, from other UEs communicating with the neighbor base stations. For both the downlink and uplink, interference due to interfering network entities such as base stations and/or UEs may degrade performance.

SUMMARY

Certain aspects of the present disclosure provide a method for wireless communications. The method generally includes receiving semi-static system information from one or more neighboring base stations (BSs), based on the received information, identifying a neighbor BS that causes interference in the physical uplink control channel (PUCCH) and identifying corresponding resources that are allocated to an interfering user equipment (UE) by the interfering neighbor base station.

Certain aspects of the present disclosure provide a method for wireless communications. The method generally includes receiving information about resources that are allocated to an interfering UE from a neighboring base station, and identifying the interfering UE based on the received information.

Certain aspects of the present disclosure provide another method for wireless communications. The method generally includes monitoring interference over thermal (IoT) information for one or more received signals, filtering the IoT information per at least one of an associated TDM partition interlace, frequency subband, or subframe, and based on the filtering, declaring existence of a proximate user equipment (UE) causing interference.

Certain aspects of the present disclosure provide another method for wireless communications. The method generally includes receiving a signal comprising at least a first symbol and a second symbol, calculating an element-wise product of frequency domain samples of the first and the second symbols, performing an inverse discrete Fourier transform (IDFT) of the element-wise product, and declaring existence of a proximate user equipment causing interference based on detection of a peak in the IDFT of the element-wise product.

Certain aspects of the present disclosure provide an apparatus for wireless communications. The apparatus generally includes receiving semi-static system information from one or more neighboring base stations (BSs), based on the received information, identifying a neighbor BS that causes interference in the physical uplink control channel (PUCCH) and identifying corresponding resources that are allocated to an interfering user equipment (UE) by the interfering neighbor base station.

Certain aspects of the present disclosure provide an apparatus for wireless communications. The apparatus generally includes means for receiving information about resources that are allocated to an interfering UE from a neighboring base station, and means for identifying the interfering UE based on the received information.

Certain aspects of the present disclosure provide another apparatus for wireless communications. The apparatus generally includes means for monitoring interference over thermal (IoT) information for one or more received signals, means for filtering the IoT information per at least one of an associated TDM partition interlace, frequency subband, or subframe, and means for based on the filtering, declaring existence of a proximate user equipment (UE) causing interference.

Certain aspects of the present disclosure provide another apparatus method for wireless communications. The apparatus generally includes means for receiving a signal comprising at least a first symbol and a second symbol, means for calculating an element-wise product of frequency domain samples of the first and the second symbols, means for performing an inverse discrete Fourier transform (IDFT) of the element-wise product, and means for declaring existence of a proximate user equipment causing interference based on detection of a peak in the IDFT of the element-wise product.

Certain aspects of the present disclosure provide an apparatus for wireless communications. The apparatus generally includes at least one processor configured to receive semi-static system information from one or more neighboring base stations (BSs), based on the received information, identify a neighbor BS that causes interference in the physical uplink control channel (PUCCH) and identify corresponding resources that are allocated to an interfering user equipment (UE) by the interfering neighbor base station; and a memory coupled with the at least one processor.

Certain aspects of the present disclosure provide an apparatus for wireless communications. The apparatus generally includes at least one processor configured to receive information about resources that are allocated to an interfering UE from a neighboring base station, and identify the interfering UE based on the received information; and a memory coupled with the at least one processor.

Certain aspects of the present disclosure provide another apparatus for wireless communications. The apparatus generally includes at least one processor configured to monitor interference over thermal (IoT) information for one or more received signals, filter the IoT information per at least one of an associated TDM partition interlace, frequency subband, or subframe, and based on the filtering, declare existence of a proximate user equipment (UE) causing interference; and a memory coupled with the at least one processor.

Certain aspects of the present disclosure provide another apparatus method for wireless communications. The apparatus generally includes at least one processor configured to receive a signal comprising at least a first symbol and a second symbol, calculate an element-wise product of frequency domain samples of the first and the second symbols, perform an inverse discrete Fourier transform (IDFT) of the element-wise product, and declare existence of a proximate user equipment causing interference based on detection of a peak in the IDFT of the element-wise product; and a memory coupled with the at least one processor.

Certain aspects of the present disclosure provide a computer program product for wireless communications comprising a computer readable medium having instructions stored thereon. The instructions are generally executable by one or more processors for receiving semi-static system information from one or more neighboring base stations (BSs), based on the received information, identifying a neighbor BS that causes interference in the physical uplink control channel (PUCCH) and identifying corresponding resources that are allocated to an interfering user equipment (UE) by the interfering neighbor base station.

Certain aspects of the present disclosure provide a computer program product for wireless communications comprising a computer readable medium having instructions stored thereon. The instructions are generally executable by one or more processors for receiving information about resources that are allocated to an interfering UE from a neighboring base station, and identifying the interfering UE based on the received information.

Certain aspects of the present disclosure provide a computer program product for wireless communications comprising a computer readable medium having instructions stored thereon. The instructions are generally executable by one or more processors for monitoring interference over thermal (IoT) information for one or more received signals, filtering the IoT information per at least one of an associated TDM partition interlace, frequency subband, or subframe, and based on the filtering, declaring existence of a proximate user equipment (UE) causing interference.

Certain aspects of the present disclosure provide a computer program product for wireless communications comprising a computer readable medium having instructions stored thereon. The instructions are generally executable by one or more processors for receiving a signal comprising at least a first symbol and a second symbol, calculating an element-wise product of frequency domain samples of the first and the second symbols, performing an inverse discrete Fourier transform (IDFT) of the element-wise product, and declaring existence of a proximate user equipment causing interference based on detection of a peak in the IDFT of the element-wise product.

Numerous other aspects are provided including methods, apparatus, systems, computer program products, and processing systems.

DETAILED DESCRIPTION

Figure 1:
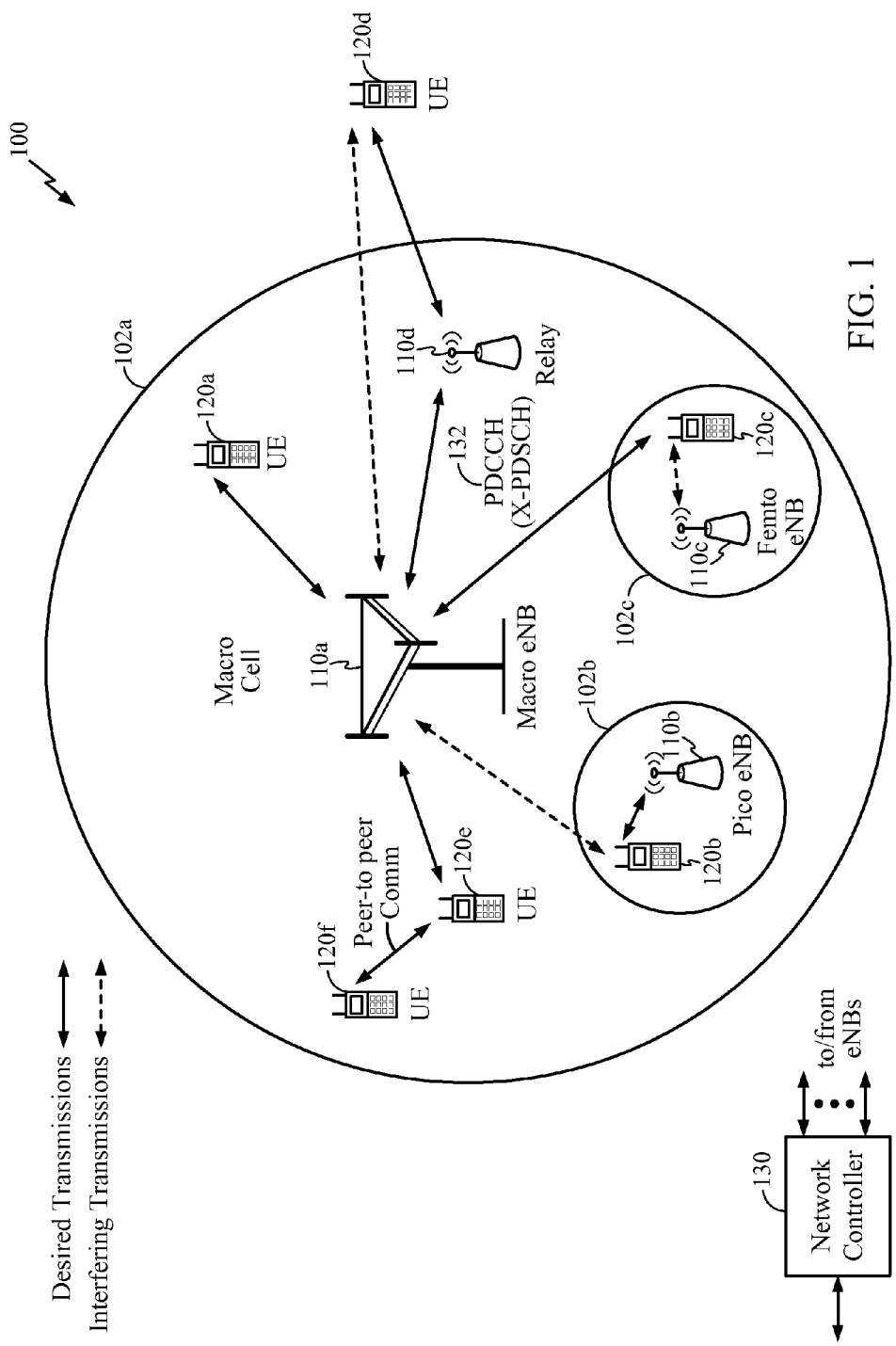
FIG. 1 illustrates an example heterogeneous wireless communications network, in accordance with certain aspects of the present disclosure.

Various aspects are now described with reference to the drawings. In the following description, for purposes of explanation, numerous specific details are set forth in order to provide a thorough understanding of one or more aspects. It will be recognized, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, an eNodeB (eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization has similar performance and essentially the same overall complexity as those of OFDMA system. SC-FDMA signal has lower peak-to-average power ratio (PAPR) because of its inherent single carrier structure. SC-FDMA has drawn great attention; especially in uplink communications where lower PAPR benefits the mobile terminal in terms of transmit power efficiency.

FIG. 1 illustrates an example heterogeneous wireless network 100, in which various aspects of the present disclosure may be practiced.

The wireless communication network 100 may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a home eNB (HeNB) or a femto eNB. In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station", and "cell" may be used interchangeably herein.

Wireless network 100 may also include relays. A relay may be an entity that can receive a transmission of data from an upstream station (e.g., an eNB or a UE) and send a transmission of the data to a downstream station (e.g., a UE or an eNB). A relay may also be a UE that can relay transmissions for other UEs. In the example shown in FIG. 1, a relay 110d may communicate with macro eNB 110a via a backhaul link and with a UE 120d via an access link in order to facilitate communication between eNB 110a and UE 120d. A relay may also be referred to as a relay eNB, a relay station, a relay base station, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage sizes, and different impact on interference in wireless network 100. For example, macro eNBs may have a high transmit power level (e.g., 5 to 40 Watts) whereas pico eNBs, femto eNBs, and relays may have lower transmit power levels (e.g., 0.1 to 2 Watts).

A network controller 130 may couple to a set of eNBs and may provide coordination and control for these eNBs. Network controller 130 may comprise a single network entity or a collection of network entities. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with macro eNBs, pico eNBs, femto eNBs, relays, etc. A UE may also be able to communicate peer-to-peer (P2P) with another UE. In the example shown in FIG. 1, UEs 120e and 120f may communicate directly with each other without communicating with an eNB in wireless network 100. P2P communication may reduce the load on wireless network 100 for local communications between UEs. P2P communication between UEs may also allow one UE to act as a relay for another UE, thereby enabling the other UE to connect to an eNB.

In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

A UE may be located within the coverage of multiple eNBs. One of these eNBs may be selected to serve the UE. The serving eNB may be selected based on various criteria such as received signal strength, received signal quality, pathloss, membership in a subscriber group, and/or the like. Received signal quality may be quantified by a signal-to-noise-and-interference ratio (SINR), or a reference signal received quality (RSRQ), or some other metric.

A UE may operate in a dominant interference scenario in which the UE may observe high interference from one or more interfering eNBs. A dominant interference scenario may occur due to restricted association. For example, in FIG. 1, UE 120c may be close to femto eNB 110c and may have high received power for eNB 110c. However, UE 120c may not be able to access femto eNB 110c due to restricted association and may then connect to macro eNB 110a with lower received power. UE 120c may then observe high interference from femto eNB 110c on the downlink and/or may also cause high interference to femto eNB 110c on the uplink.

A dominant interference scenario may also occur due to range extension, which is a scenario in which a UE connects to an eNB with lower pathloss and possibly lower SINR among all eNBs detected by the UE. For example, in FIG. 1, UE 120b may be located closer to pico eNB 110b than macro eNB 110a and may have lower pathloss for pico eNB 110b. However, UE 120b may have lower received power for pico eNB 110b than macro eNB 110a due to a lower transmit power level of pico eNB 110b as compared to macro eNB 110a. Nevertheless, it may be desirable for UE 120b to connect to pico eNB 110b due to the lower pathloss. This may result in less interference to the wireless network for a given data rate for UE 120b.

Various interference management techniques may be used to support communication in a dominant interference scenario. These interference management techniques may include semi-static resource partitioning (which may be referred to as inter-cell interference coordination (ICIC)), dynamic resource allocation, interference cancellation, etc. Semi-static resource partitioning may be performed (e.g., via backhaul negotiation) to allocate resources to different cells. The resources may comprise subframes, subbands, carriers, resource blocks, transmit power, etc. Each cell may be allocated a set of resources that may observe little or no interference from other cells or their UEs. Dynamic resource allocation may also be performed (e.g., via exchange of over-the-air messages between cells and UEs) to allocate resources as needed to support communication for UEs observing strong interference on the downlink and/or uplink. Interference cancellation may also be performed by UEs to mitigate interference from interfering cells.

Wireless network 100 may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single HARQ interlace, which may include every Q-th subframes, where Q may be equal to 4, 6, 8, 10, or some other value. For asynchronous HARQ, each transmission of the packet may be sent in any subframe, subject to a minimum delay from the previous transmission of the same packet.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 100 may utilize frequency division duplex (FDD) or time division duplex (TDD). For FDD, the downlink and uplink may be allocated separate frequency channels, and downlink transmissions and uplink transmissions may be sent concurrently on the two frequency channels. For TDD, the downlink and uplink may share the same frequency channel, and downlink and uplink transmissions may be sent on the same frequency channel in different time periods.

Figure 2:
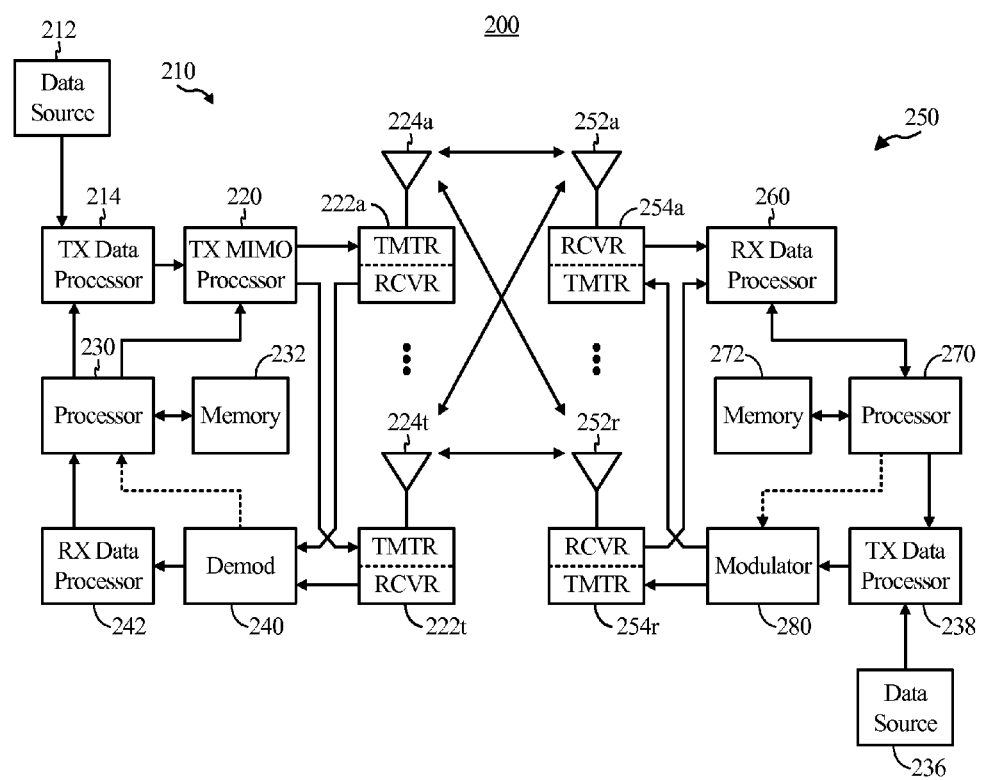
FIG. 2 illustrates a block diagram of example components of an access point and an access terminal, in accordance with certain aspects of the present disclosure.

FIG. 2 is a block diagram 200 showing example components of an exemplary base station 210 and access terminal 250 in an example wireless system 200. The base station 210 can be an access point or eNB such as one of the eNBs 110 illustrated in FIG. 1 and the access terminal 250 can be a user equipment such as one of the UEs 120 illustrated in FIG. 1.

At the base station 210, traffic data for a number of data streams is provided from a data source 212 to a transmit (TX) data processor 214. A processor 230 may generate control information to be transmitted to the AT 250.

A TX data processor 214 formats, codes, and interleaves the traffic data for each data stream based on a particular coding scheme selected for that data stream to provide coded data. The coded data for the data streams and control information may be multiplexed with pilot data using OFDM techniques.

The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M is generally a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Transmitters 222 receive and process symbol streams for each downlink component carrier to provide one or more analog signals, and further condition (e.g., amplify filter, and upconvert) the analog signals to provide a modulated signal suitable for transmission over the MIMO channel. $N_T$ modulated signals from transmitters 222a through 222t are then transmitted from $N_T$ antennas 224a through 224t, respectively.

At the access terminal 250, the transmitted modulated signals for the downlink component carriers are received by $N_R$ antennas 252a through 252r and the received signal from each antenna 252 is provided to a respective receiver (RCVR) of the receivers 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream for each configured component carrier to recover the traffic data and control information, for example, including PDSCH and broadcast signals (which may be protected by careful resource allocation in potentially interfering cells as described herein).

The processing by RX data processor 260 may be complementary to that performed by TX MIMO processor 220 and TX data processor 214 at transmitter system 210. A processor 270 that may be coupled to a memory 272 periodically determines which pre-coding matrix to use. Processor 270 formulates an uplink message comprising a matrix index portion and a rank value portion.

An uplink (reverse link) message may comprise various types of information regarding the communication link and/or the received data stream. The uplink message may then processed by a TX data processor 238, which also receives traffic data for a number of data streams from a data source 236, modulated by a modulator 280, conditioned by transmitters 254a through 254r.

At transmitter system 210, the uplink transmissions from access terminal 250 are received by antennas 224, conditioned by receivers 222, demodulated by a demodulator 240 and processed by a RX data processor 242 to extract the reserve link message transmitted by the receiver system 250. Processor 230 can then determine various parameters, such as which pre-coding matrix to use for determining beamforming weights, and continue processing the extracted message.

An Exemplary Proximity Detection Method and Apparatus

In conventional wireless systems, user equipments (UEs) are typically connected to the closest base station in order to maximize downlink (DL) and uplink (UL) signal to noise ratio (SNR) and to minimize near-far effects. However, in certain wireless networks, a UE may not be allowed to connect to the closest base station. For example, if base stations with closed subscriber groups (CSGs) are deployed in a network, and if a UE is not a member of the CSG of the closest base station in its vicinity, the UE may not be able to connect to its closest base station. This may result in serious interference scenarios for the UE when the UE is connected to a more distant base station while in close proximity to a CSG base station.

Another example scenario involves a heterogeneous network (HetNet), where DL power from a Pico cell is typically much lower than from a Macro cell. In this case, the UE will typically be much closer to the Pico cell in order to detect the DL signal from the Pico. But on the UL, the UE may have already caused strong interference to the Pico cell.

Certain aspects of the present disclosure may mitigate interference under the above mentioned conditions (and similar scenarios) by providing mechanisms whereby a base station may become aware of UEs that are in its proximity, but not connected to it. As described herein, different techniques may be employed for such proximity detection. Once an interfering or potentially interfering UE is detected, interference management may be performed to mitigate interference to/from the UE.

Certain aspects are described below with reference to a base station (e.g., an eNB of a CSG) performing such proximity detection and/or interference mitigation. However, those skilled in the art will recognize that similar operations may also be performed by another network entity such as a UE, for example, to mitigate interference with a potentially interfering or interfering UE in its proximity when performing peer-to-peer (P2P) operations with another UE.

Certain aspects of the present disclosure provide methods for detection of a potentially interfering or interfering UE in the proximity of a detecting entity (e.g., a base station or a UE). The proposed detection scheme may utilize semi-static system information from one or more neighboring base stations (BSs) to identify a neighbor BS that causes interference in the physical uplink control channel (PUCCH). The proposed detection scheme may also identify corresponding resources that are allocated to an interfering UE by the interfering neighbor base station.

Figure 3:
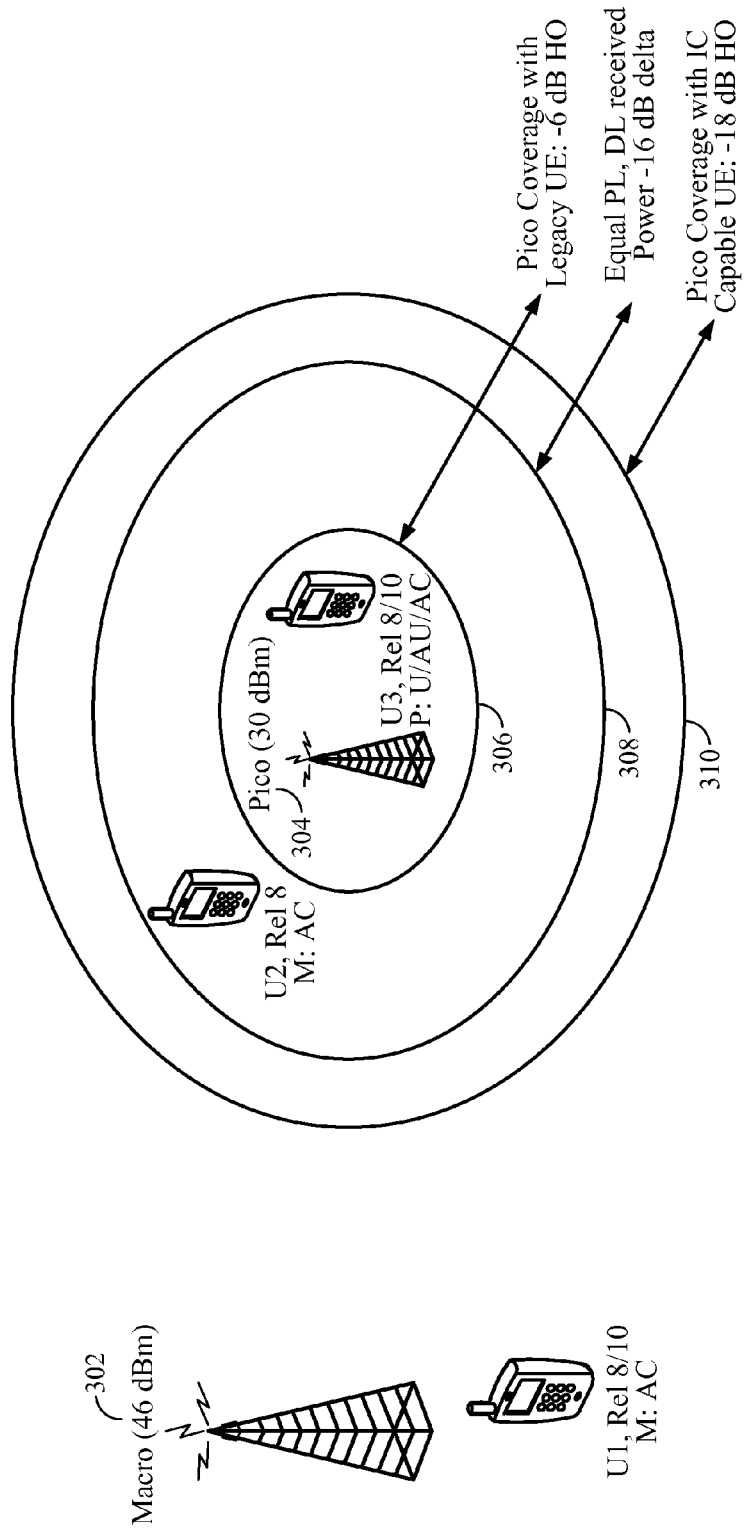
FIG. 3 illustrates an example interference condition in a heterogeneous network including a macro enhanced node B (eNB), and a pico node, in accordance with certain aspects of the present disclosure.
Figure 4:
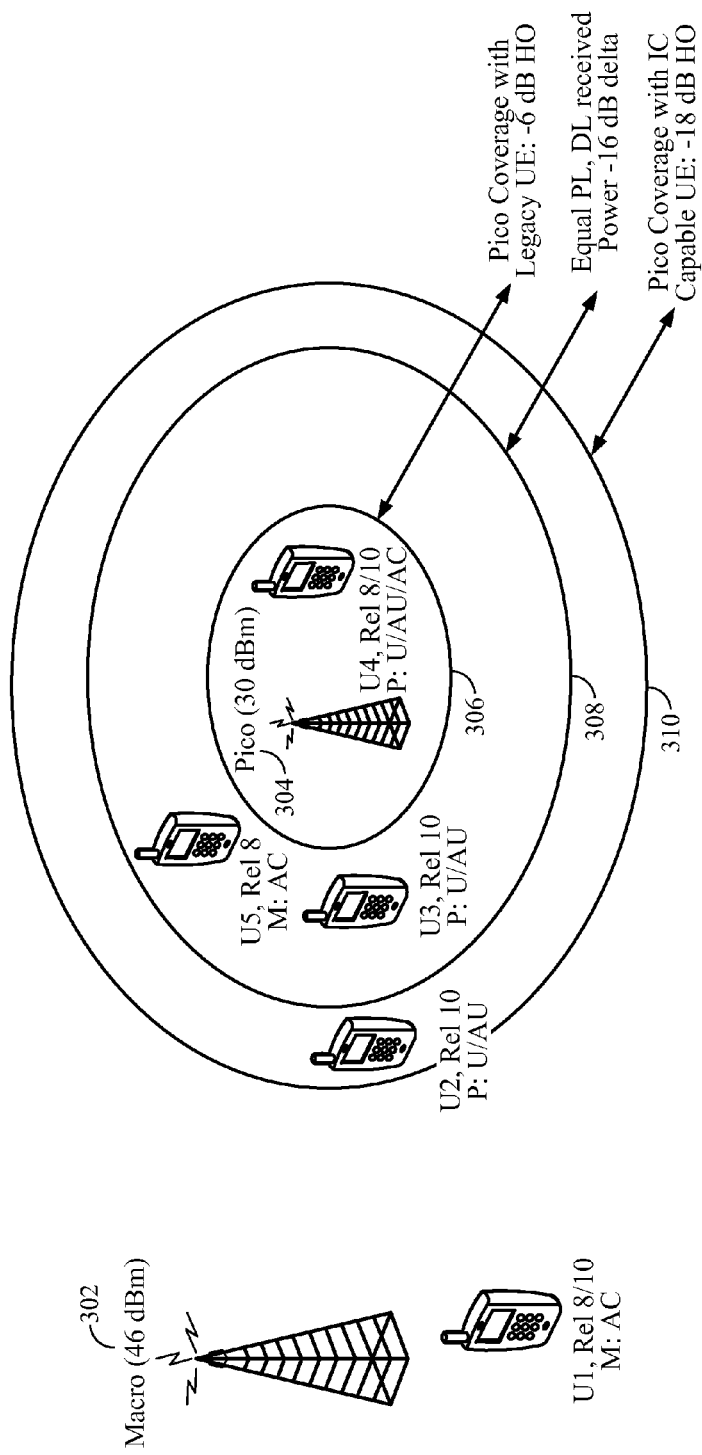
FIG. 4 illustrates another example interference condition in a heterogeneous network, in accordance with certain aspects of the present disclosure.

FIGS. 3 and 4 illustrate two example interference conditions in a heterogeneous network including a macro eNB 302, and a pico eNB 304, in accordance with certain aspects of the present disclosure. FIG. 3 illustrates interference conditions for the pico eNB without range extension (RE). Coverage area of the pico eNB with legacy UE is shown with curve 306. The area with equal path-loss and downlink received power equal to −16 dB delta is shown in curve 308. Also, curve 310 shows the coverage area of the pico eNB if the UE is capable of performing interference cancellation. The user equipment U1 312, which may be compatible with Rel-8/10 of the LTE standard, is served by the macro eNB 302 on Adaptive Common (AC) channel. The user equipment U2 314 may be compatible with Rel-8, and may be served by the macro eNB on AC. The user equipment U3 316 may be compatible with Rel-8/10, and may be served by the pico eNB 304 on AC. As illustrated, U2 314 is close to the pico eNB 304, but is not connected to it. As a result, U2 314 may receive strong interference from the pico eNB, and transmissions by the U2 may cause interference for the pico eNB.

FIG. 4 illustrates interference conditions in a heterogeneous network 400 for the pico eNB with TDM partitioning. In this figure, range extension may be triggered by a UE capable of performing interference cancellation (IC). In addition to the nodes in the heterogeneous network 300, the heterogeneous network 400 has two extra user equipments (e.g., U4 and U5). The user equipment U4 320 may be served by the pico eNB using range extension. U4 may be compatible with the Rel-10 and be served on usable (U) or Adaptive Usable (AU) channels. U5 may also be served by the pico eNB using range extension. U5 may be compatible with Rel-10 and be served on U/AU. In this network, the user equipment U2 may receive even more interference compared to the case illustrated in FIG. 3, because of the range extension that may be triggered by the UEs that are capable of performing interference cancellation procedures.

In a heterogeneous network such as the network 100 in FIG. 1, base stations may have different power classes. For example, macro cells may have 46 dBm nominal power, pico cells may have 30 dBm nominal power, and femto cells may have 21 dBm nominal power. Therefore, low-power nodes may receive strong interference from high power nodes.

In open access networks, any UE may connect to a low-power node (e.g., pico eNB), whereas in a restricted association (e.g., CSG), only some UEs (e.g., UEs that are part of the CSG) are allowed to access the low-power node.

In a heterogeneous network, for a femto node with CSG, a UE who is communicating with a macro eNB (e.g., a macro cell UE) can penetrate deeply into the coverage area of the femto eNB without being able to access the femto eNB. This may result in high amounts of interference on femto users (e.g., UEs that are communicating with the femto eNB). If a femto UE increases its power to mitigate the interference from the macro UE, the femto UE may also create large interference for uplink communications with the macro eNB. This may result in power racing conditions. For example, each UE may increase its power to mitigate interference from the other nodes. The increase in power may result in increased interference for other UEs, which may in turn increase their transmission power.

For a pico eNB with open access, due to path-loss differences, even at the equal path-loss boundary (e.g., curve 308), the macro UE (e.g., U2 314 in FIG. 3) may jam the pico uplink communications (e.g., by 46−30=16 dB) with nominal transmission power. If the macro eNB does not support enhanced inter-cell interference coordination (eICIC), the macro eNB may create high amounts of interference for the uplink transmissions to the pico eNB. If the macro eNB supports eICIC, physical uplink shared channel (PUSCH) and physical uplink control channel (PUCCH) acknowledgement (ACK) data may be orthogonalized by time division multiplexing (TDM). However, channel quality indicator (CQI) channel may still have interference because its periodicity may not be compatible with the partitioning pattern employed in the TDM. Especially in these situations, it may be important for an eNB (e.g., pico eNB, macro eNB) to perform proximity detection, and/or trigger uplink interference management schemes as described in more detail herein.

In an example architecture, a blind detection scheme (e.g., an interference over thermal (IoT) monitoring and interference detection scheme) may be implemented in layer one (L1). Interference detection may be performed in channel processors, including PUSCH, PUCCH, sounding reference signal (SRS), and/or on the resources that are not yet assigned. The interference plus noise level may be calculated per resource block (RB) and/or per slot and reported to layer two (L2) for further processing. For example, L2 may perform further filtering such as per TDM partition interlace, per frequency subband, and/or per subframe if PUSCH frequency hopping is disabled. A detection threshold may be chosen so that a high IoT is detected. When a high IoT is detected, the system may control the IoT level, issue an overload indication, and/or indicate proximity of a jammer. It should be noted that selection of the threshold may further depend on the eNB's knowledge of path loss from other eNBs. However, other blind detection schemes may be employed.

Certain aspects propose a proximity detection method based on semi-blind PUCCH detection. In wireless systems, one of the main sources of interference may be the PUCCH channel (e.g., CQI transmission) that may not be partitioned in time (e.g., through TDM) even with eICIC.

Certain aspects of the present disclosure propose a semi-blind algorithm for detecting a jammer in PUCCH. In the proposed scheme, information associated with system information block (SIB2) from neighboring cells may be used for detecting interferers. A detecting entity (e.g., an eNB or a UE) may receive cell identities (IDs) and/or semi-static configuration parameters from each neighboring cell in SIB2 messages. The semi-static parameters may include CGS hopping configuration (e.g., Group-hopping-enabled), PUCCH CQI resource block (RB) region (e.g., N_RB_2), PUCCH mixed ACK/CQI RB region (e.g., N_CS_1), number of maximum users in PUCCH ACK RB (e.g., delta PUCCH-shift), cell SRS configuration, and/or the like.

Figure 5:
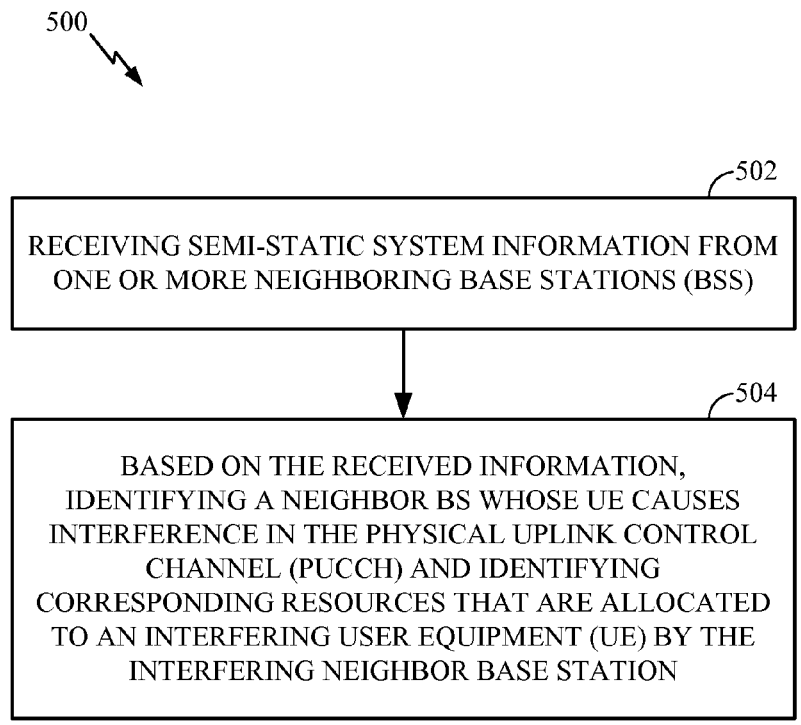
FIG. 5 illustrates example operations that may be performed, for example, by a detecting base station, for detecting proximity of a potentially interfering or interfering user equipment (UE), in accordance with certain aspects of the present disclosure.

FIG. 5 illustrates example operations 500 that may be performed by a detecting entity (e.g., a base station or a UE acting in P2P mode) for detecting proximity of a potentially interfering or interfering UE, in accordance with certain aspects of the present disclosure. The detecting entity performing these operations may be as described in connection with any of FIGS. 1-2. For instance, exemplary operations 500 may be directed by one or more processors (such as processors 230 or 270).

The operations may begin at 502, by receiving semi-static system information in one or more system information blocks (SIB) from one or more neighboring base stations. At 504, based on the received information, the detecting entity may identify a neighbor BS that causes interference in the physical uplink control channel (PUCCH). In addition, the detecting entity may identify corresponding resources that are allocated to an interfering UE by the interfering neighbor base station. The detecting entity may transmit information about the resources that are allocated to the interfering UE to the identified neighbor BS. The transmitted information may used by the neighbor BS for interference management.

For certain aspects, the semi-static system information may be received by listening to signals in the network and/or over X2 interface and/or fiber connection from the neighboring base stations. The semi-static system information may include one or more of system information associated with PUCCH ACKs, system information associated with a CQI channel, computer generated sequences (CGS) hopping configuration, PUCCH channel quality indicator (CQI) resource block (RB) region, PUCCH mixed acknowledgement (ACK)/CQI RB region, maximum number of users in PUCCH ACK RB, or cell sounding reference signal (SRS) configuration and the like.

For certain aspects, the detecting entity may manage interference caused by the interfering UE. In one aspect, the detecting entity may send an overload indication message to the neighbor BS. In another aspect, the detecting entity may send a message to the neighbor BS that asks the neighbor BS manage the interference (e.g., cause the interfering UE to transfer to another BS, reduce power or be scheduled differently). For certain aspects, the detecting entity may schedule in frequency division multiplexing (FDM) or time division multiplexing (TDM) to avoid interference.

In one aspect, the detecting entity may send one or more beacon signals to trigger interference measurements from the interfering UE. As a result, the UE may be handed over to a different frequency by the neighbor base station. For certain aspects, the detecting entity may perform adaptive noise padding to protect uplink transmissions from interference.

For certain aspects, the detecting entity may identify the neighbor BS that causes interference by comparing energy of an acknowledgment channel of a neighboring BS with a threshold. The detecting entity may then declare proximity of the interfering UE served by the neighboring BS if energy of the acknowledgement channel is equal to or greater than the threshold.

The detecting entity may also identify the neighbor BS that causes interference by comparing signal to noise ratio (SNR) of channel quality indicator (CQI) of a neighboring BS with a threshold, and declaring proximity of the interfering UE served by the neighboring BS if SNR of the CQI is equal to or greater than the threshold.

Figure 6:
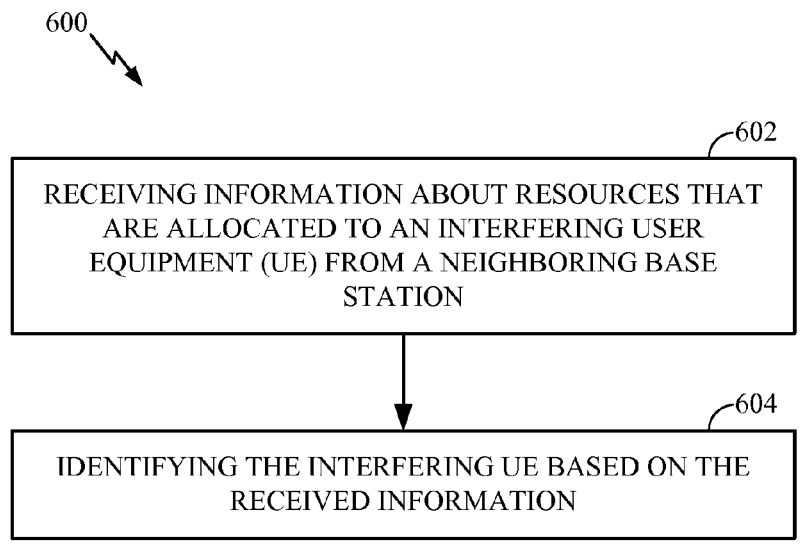
FIG. 6 illustrates example operations that may be performed, for example, by a neighbor base station, for managing interference from an interfering UE, in accordance with certain aspects of the present disclosure.

FIG. 6 illustrates example operations 600 that may be performed, for example, by a neighbor base station, for managing interference from an interfering UE, in accordance with certain aspects of the present disclosure. At 602, the neighbor base station may receive information about resources that are allocated to an interfering UE from a base station (e.g., the detecting entity). For example, the neighbor base station may receive an overload indication message from the BS. At 604, the neighbor base station may identify the interfering UE based on the received information. The neighbor base station may then manage interference caused by the interfering UE. For example, the neighbor BS may assign a different frequency to the interfering UE. The neighbor base station may also schedule the UE differently, ask the interfering UE to transfer to another BS and/or to reduce its power such that the interference on the detecting entity is reduced. The neighbor base station may also schedule the interfering UE in FDM or TDM to mitigate interference.

Figure 7:
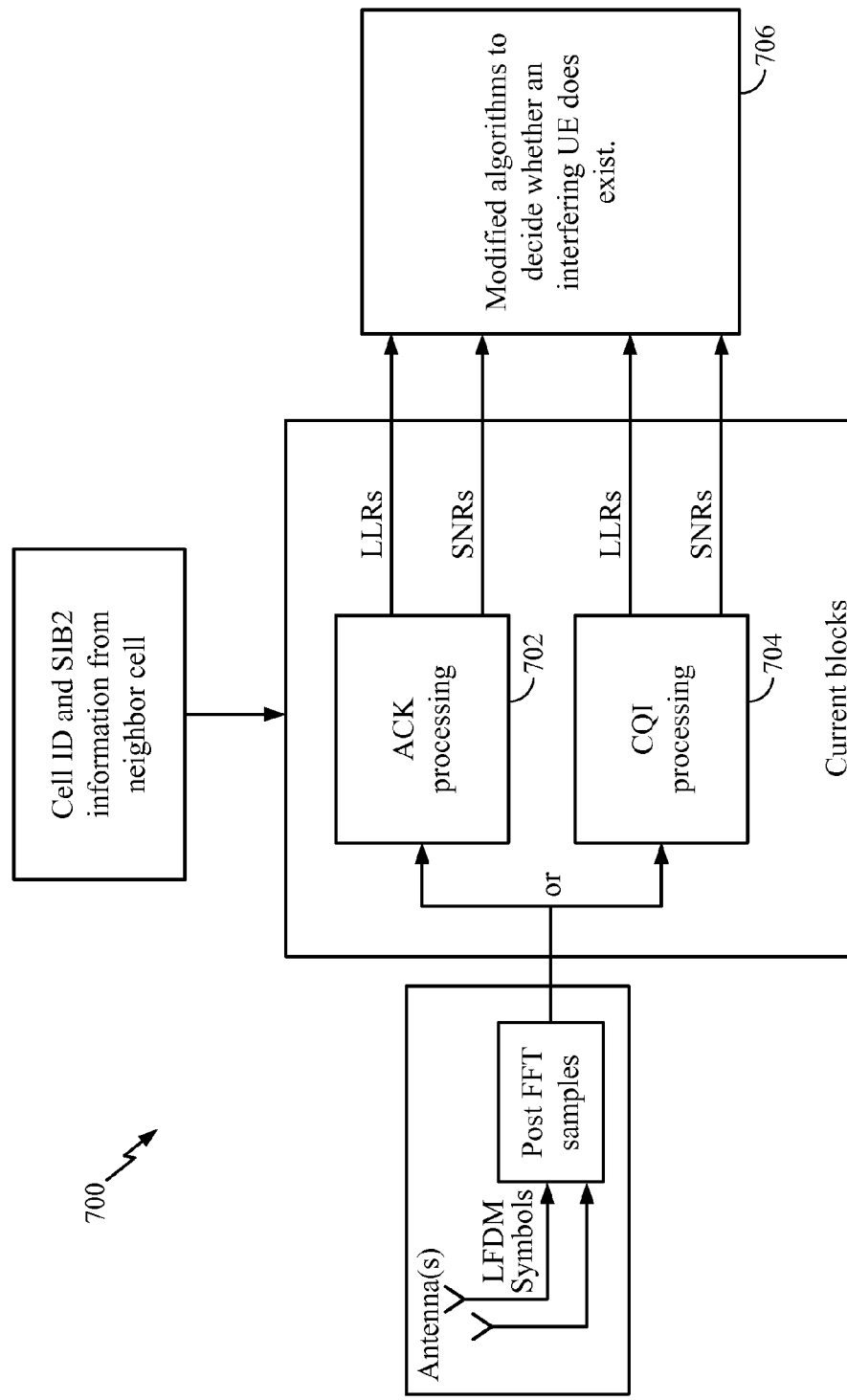
FIG. 7 illustrates an example block diagram of a proximity detection architecture using a proposed semi-blind proximity detection scheme, in accordance with certain aspects of the present disclosure.

FIG. 7 illustrates an example block diagram of a proximity detection architecture using the proposed semi-blind proximity detection scheme, in accordance with certain aspects of the present disclosure. The proximity detection architecture may utilize an ACK processor 702 and a CQI processor 704. Both of the ACK processor and the CQI processor may use current algorithms as defined in the LTE standard. The proximity detection architecture may also include a processor block 706 that may perform algorithms for detection of interfering UEs, as described herein.

The ACK processor 702 and the CQI processor 704 may receive cell ID and/or SIB2 information from neighbor eNBs. They may also receive samples of the received signal from the antennas after being passed through a Fast Fourier Transform (FFT) block. The ACK processor and the CQI processor may calculate log likelihood ratios (LLRs) and/or signal to noise ratios (SNRs) of the ACK channel and the CQI channel, respectively, based on the received values. The generated LLR and/or SNR values may then be used by the processor block 706 for the proximity detection.

The processor 706 may include a tri-state decoding for detecting ACK channels. For the tri-state decoding, different thresholds may be used for regular ACK channel detection and the proximity detection. In addition, joint considerations of LLR and SNR may be used for proximity detection. As an example, different ACK hypothesis may be used for formats 2a and 2b. In addition, different SNR thresholds may be used for regular CQI detection and proximity detection. For example, if SNR for CQI channel exceeds a certain threshold, existence or proximity of interfering UEs may be declared. As another example, if the tri-state ACK detector identifies ACK/NACK energy passing a certain threshold, existence or proximity of interfering ACK channels may be declared.

For certain aspects, in a different proximity detection method (property-based proximity detection), more detailed processing may be performed on each uplink channel, such as PUSCH for data or demodulation reference signal (DM-RS), SRS, PRACH, PUCCH, and/or the like. Each PUCCH symbol may be a cyclic shift (in time domain) and modulated version of the same sequence. By taking element-wise product of r(k) and r*(s) (in which * represents conjugate) in frequency domain across symbols, and taking inverse discrete Fourier transform (IDFT) of the product, burst of a plurality of (e.g., 6) peaks may be found. One goal of the processing may be to identify a single dominant interferer from a combination of some non-dominant transmissions and noise.

It should be noted that eNB-based proximity detections may only work with UEs that are connected to a base station and have active uplink transmissions. For detection of UEs that are in idle state, or UEs that are connected to a base station but do not have a transmission, UE-based techniques may be used. The UE-based techniques may detect proximity of a UE based on primary synchronization signal (PSS), secondary synchronization signal (SSS), physical broadcast channel (PBCH), and the like.

For certain aspects, frequency domain correlation of the signals in a channel (e.g., PUCCH) may be used for proximity detection. For example, each symbol in PUCCH may be a cyclic shift (in time domain) and modulated version of a known sequence. There may also exist a plurality (e.g., seven) symbols within one slot. In the proximity detection using frequency domain correlation scheme, two arbitrary symbols (e.g., symbols a and b) may be selected in frequency domain. Next, element-wise product of a(k) and b*(k) may be calculated. a(k) and b(k) may represent the frequency domain samples of a resource block of a PUCCH that may possibly have interference. Next, IDFT of the element-wise product of a(k) and b*(k) may be calculated as follows:

$$\sum_{k=0}^{11} a(k)b^*(k)e^{\frac{-j2\pi kn}{N}}$$

in which n represents index of each sample, and N represents total number of samples.

In the next step, one or more peaks may be detected if there is a dominant interference. Therefore, if there are one or more peaks, proximity of a dominant interferer may be declared. For certain aspects, these results may be combined across different receive antennas (r), as follows:

$$\sum_{r}\sum_{k=0}^{11} a_r(k)b_r^*(k)e^{\frac{-j2\pi kn}{N}}$$

For certain aspects, similar frequency domain processing may be performed across different slots and/or across different symbol pairs. If some or all of the symbol pairs have one or more peaks exceeding a threshold, then proximity of an uplink channel (e.g., PUCCH) jammer may be declared.

Figure 8:
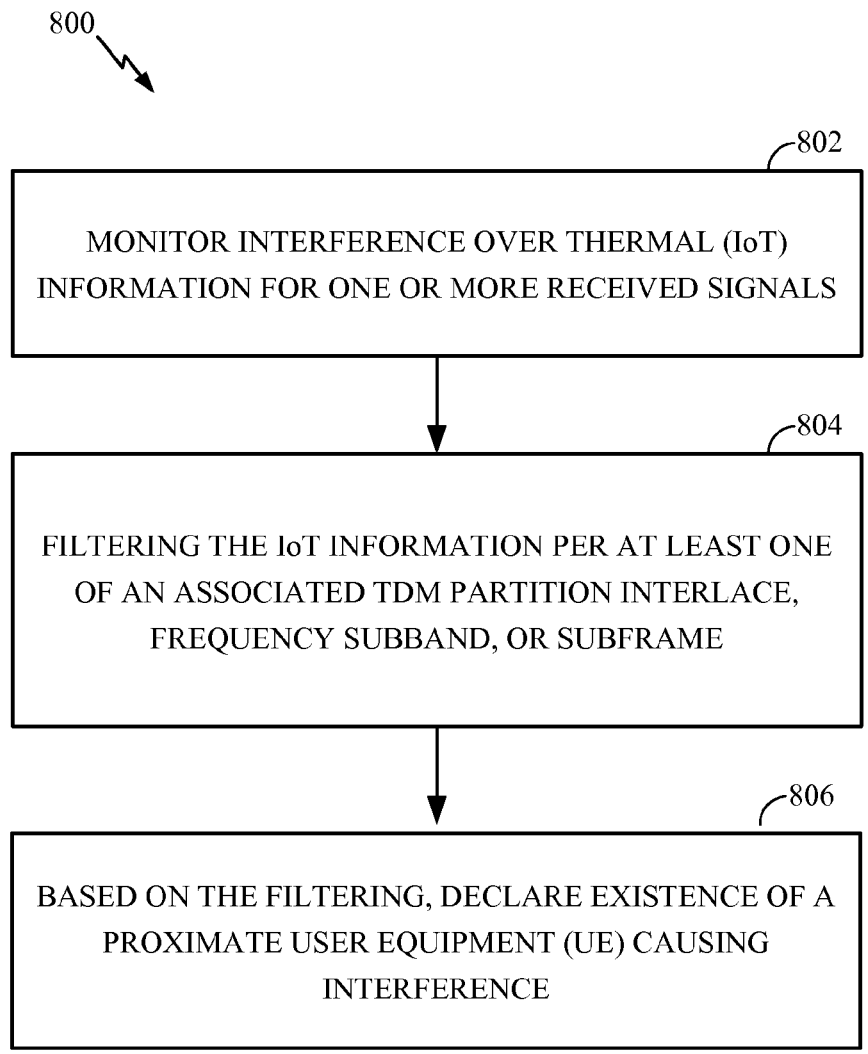
FIG. 8 illustrates example operations that may be performed, for example, by a detecting base station, for detecting proximity of a potentially interfering or interfering UE, in accordance with certain aspects of the present disclosure.

FIG. 8 illustrates example operations 800 that may be performed by a detecting entity (e.g., a base station or a UE acting in P2P mode) for detecting proximity of a potentially interfering or interfering UE, in accordance with certain aspects of the present disclosure. At 802, the detecting entity may monitor interference over thermal (IoT) information for one or more received signals. At 804, the detecting entity may filter the IoT information per at least one of an associated TDM partition interlace, frequency subband, or subframe. At 806, based on the filtering, the detecting entity may declare existence of a proximate user equipment (UE) causing interference.

Figure 9:
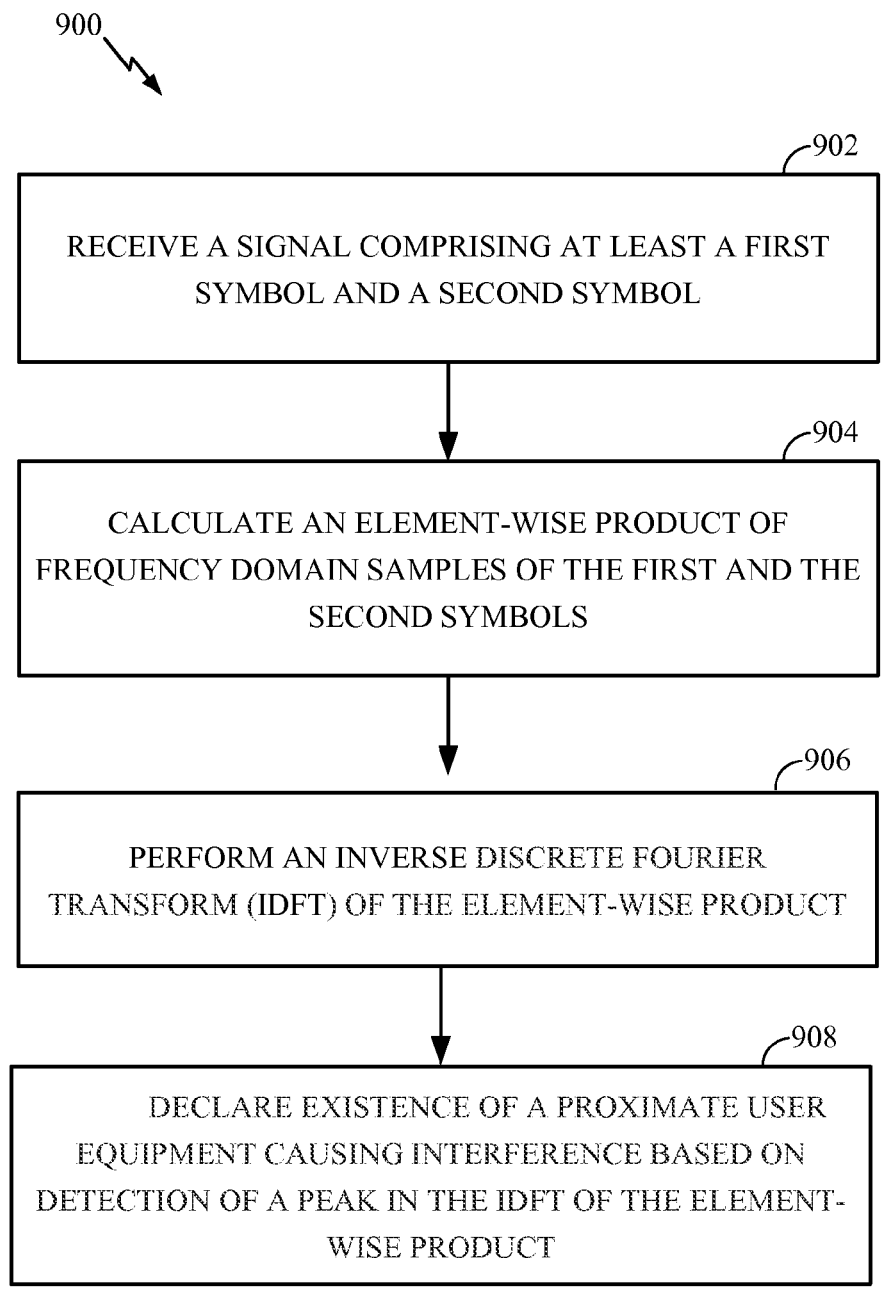
FIG. 9 illustrates example operations that may be performed, for example, by a detecting base station, for detecting proximity of a potentially interfering or interfering UE, in accordance with certain aspects of the present disclosure.

FIG. 9 illustrates example operations 900 that may be performed by a detecting entity (e.g., a base station or a UE acting in P2P mode) for detecting proximity of a potentially interfering or interfering UE, in accordance with certain aspects of the present disclosure. At 902, the detecting entity may receive a signal comprising at least a first symbol and a second symbol. At 904, the detecting entity may calculate an element-wise product of frequency domain samples of the first and the second symbols. At 906, the detecting entity may perform an inverse discrete Fourier transform (IDFT) of the element-wise product. At 908, the detecting entity may declare existence of a proximate user equipment causing interference based on detection of one or more peaks in the IDFT of the element-wise product.

For certain aspects, after detection of a strong interferer in close proximity, the eNB may manage the interference using one or a combination of the following methods. For example, the eNB may use frequency division multiplexing and/or time division multiplexing to schedule the UEs to reduce interference; may use adaptive noise padding to protect uplink transmissions of the UEs that are served by the other eNB (e.g., a femto eNB); and/or may send an overload indication to the neighbor base station asking to reduce interference.

For certain aspects, if the PUCCH is jammed by a legacy UE but PUSCH is clean due to TDM partitioning, the eNB may assign SPS signals such that some or all of the PUCCH transmissions are transmitted on PUSCH to mitigate interference. In an aspect, the eNB may send beacon signals over the frequency that is used by the macro eNB to trigger interference measurements from the UE. As a result, the UE may be handed over to the femto cell in a different frequency.

Currently, overload indicator schemes that are based on eICIC may only rely on long term averaged results. Once overload indication is signaled, neighbor cells may power down multiple UEs because detailed information about the exact interfering UE is not available. For example, the IoT-based proximity detection scheme is very simple, and provides general information for interference in terms of frequency allocation and/or time. This information may be used to identify patterns of the interference and help in interference management. However, the IoT-based proximity detection scheme may not have an indication of which neighbor cell is causing the interference.

Using the proposed semi-blind PUCCH detection scheme, the eNB may have knowledge about both the interfering cell as well as the resource allocation of the jamming PUCCH channel. This information may be fed back to the jamming eNB for exact identification of the jammer UE and interference management.

The proposed semi-blind PUCCH detection scheme may reuse the PUCCH algorithms that are available in current standards. Semi-static information from SIB2 may be used from neighbor cells (e.g., either from backhaul exchange over X2 interface and/or from network listening). The semi-blind PUCCH detection scheme may identify which neighbor cell is causing the interference in addition to PUCCH resource allocations for the interferer.

Figure 10:
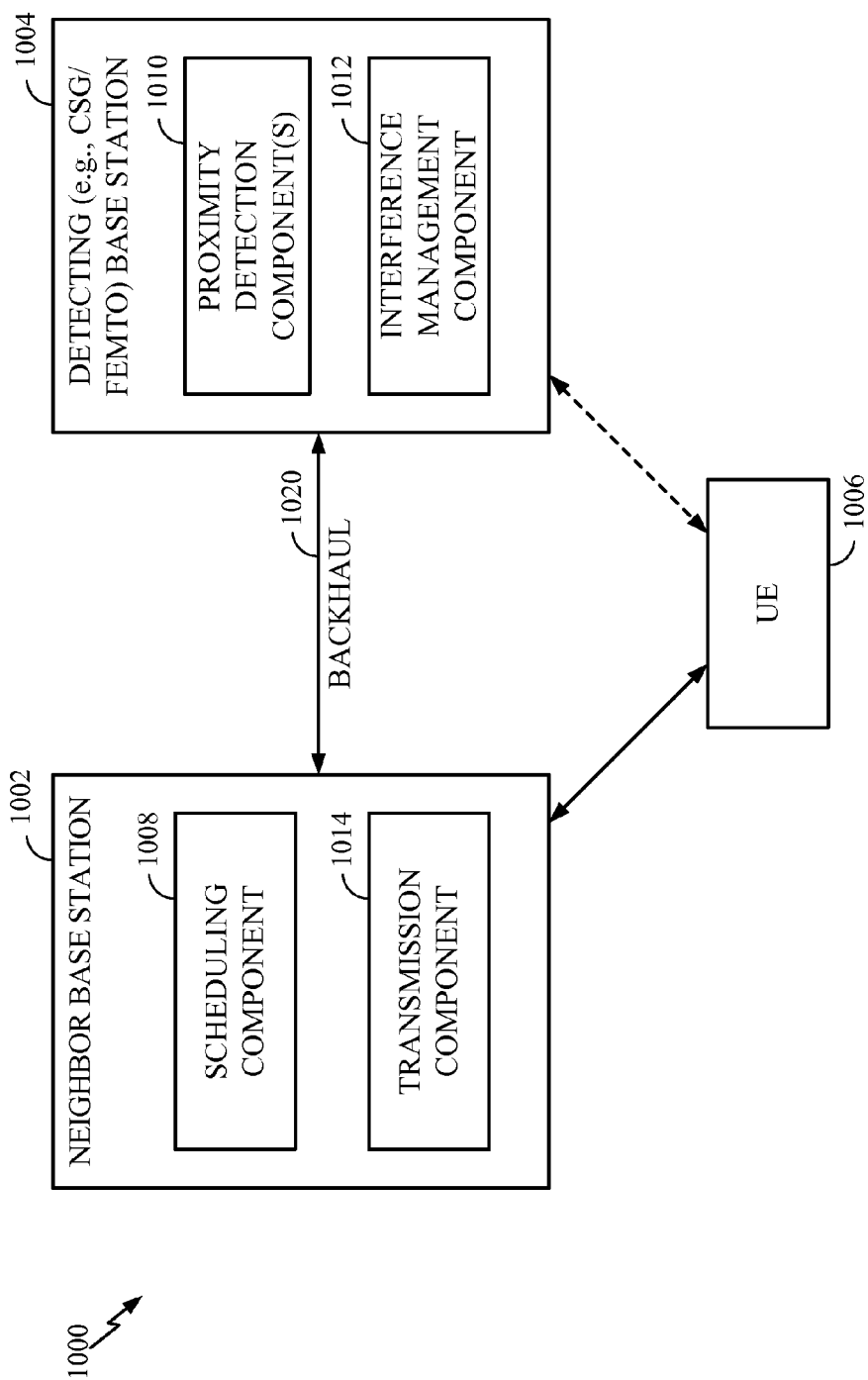
FIG. 10 illustrates an example communication system capable of mitigating interference through detection of a potentially interfering or interfering UE, in accordance with certain aspects of the present disclosure.

FIG. 10 illustrates an example communication system 1000 capable of mitigating interference through detection of a potentially interfering or interfering UE. In the illustrated example, UE 1006 is in proximity of a base station 1004, but the UE is not connected to the base station 1004. As with FIG. 1, potentially interfering or interfering transmissions are indicated with a dashed line.

As illustrated, system 1000 includes the BS 1004 and a neighbor base station 1002 of a first cell (e.g., a base station serving the potentially interfering or interfering UE 1006). The base stations 1002/1004 and the UE 1006 may operate in a similar manner to the base stations and UEs described in connection with FIGS. 1-2. The BS 1004 and the neighbor BS 1002 may communicate through the backhaul and/or wireless signaling 1020.

System 1000 may be a heterogeneous network, in which different power classes of nodes (e.g., macro, femto or pico base station) co-exist. For example, the detecting base station 1004 may be a femto eNB and the neighbor base station 1002 may be a macro eNB. In such systems, UEs (e.g., UE 1006 or disparate UE not shown) may observe strong interference in the downlink from nodes from different power class cells. As described above, in a closed-subscriber-group (CSG) cell, a macro UE may not be allowed to access the CSG cell, but if the macro UE is in proximity to the CSG eNB, uplink transmissions from the macro UE may be a dominant interferer (e.g., to the CSG cell).

For certain aspects, when a potentially interfering or interfering UE is detected, information regarding the interfering UE may be passed to an interference management component 1012 that may take action. For example, the interference management component may control downlink transmissions in an effort to mitigate interference with uplink transmissions from the interfering UE. The interference management component may also send an indication to the neighbor base station 1002 with information regarding the interfering UE and ask the neighbor base station 1002 to help reduce interference on the base station 1004 (e.g., by rescheduling the UE on another frequency/resources and/or causing the UE to handover to another BS, and/or the like).

The detecting BS 1004 may listen for transmissions from the neighbor BS 1002 and use this information to assist in detecting the proximity of the UE 1006. For example, the detecting BS 304 may monitor transmissions from a transmitting component 1014 of the BS 1002 (with characteristics of the transmissions determined by a scheduling component 1008) to gather information regarding UEs in its vicinity. The detecting BS 1004 may read System Information Block (SIB) information, and/or monitor typical scheduling decisions of the neighbor base station 1002 (made by the scheduling component 1008).

The various operations corresponding to blocks illustrated in the methods of FIGS. 5 and 6 described above may be performed by various hardware and/or software component(s) and/or module(s). For example, means for receiving may be any suitable receiving component, such as a receiver 254, as illustrated in FIG. 2. Means for identifying, means for managing interference, means for scheduling, means for assigning, means for performing, means for comparing, means for declaring, means for causing, and means for scheduling may be any suitable processing component, such as the processors 230, 270 as illustrated in FIG. 2. Means for transmitting and/or means for sending may be any suitable transmitting component, such as the transmitter 222, as illustrated in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

As used herein, a phrase referring to "at least one of" a list of items refers to any combination of those items, including single members. As an example, "at least one of: a, b, or c" is intended to cover: a, b, c, a-b, a-c, b-c, and a-b-c.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications by an apparatus, comprising:
    receiving semi-static system information from one or more neighboring base stations (BSs);
    based on the received information, identifying a neighbor BS whose user equipment (UE) causes interference in a physical uplink control channel (PUCCH) associated with the apparatus and identifying corresponding resources that are allocated to the interfering UE by the neighbor BS, wherein identifying the neighbor BS that causes interference comprises comparing signal to noise ratio (SNR) of channel quality indicator (CQI) of a neighboring BS with a threshold; and
    transmitting information about the resources that are allocated to the interfering UE to the identified neighbor BS, wherein the transmitted information is used by the identified neighbor BS for managing interference.

2. The method of claim 1, wherein the semi-static system information comprises system information block (SIB2) information that is received by listening to signals received in a network.

3. The method of claim 2, wherein the semi-static system information comprises at least one of computer generated sequences (CGS) hopping configuration, PUCCH channel quality indicator (CQI) resource block (RB) region, PUCCH mixed acknowledgement (ACK)/CQI RB region, maximum number of users in PUCCH ACK RB, or cell sounding reference signal (SRS) configuration.

4. The method of claim 1, wherein the semi-static system information comprises system information associated with PUCCH ACKs.

5. The method of claim 1, wherein the semi-static system information comprises system information associated with a PUCCH CQI channel.

6. The method of claim 1, wherein the semi-static system information is received over at least one of an X2 interface or fiber connection from the neighboring base stations.

7. The method of claim 1, further comprising:
    managing interference caused by the interfering UE.

8. The method of claim 7, wherein managing interference comprises:
    scheduling a served UE in frequency division multiplexing (FDM) or time division multiplexing (TDM) to avoid interference.

9. The method of claim 7, wherein managing interference comprises:
    assigning semi-persistent scheduling (SPS) such that one or more PUCCH are transmitted on physical uplink shared channel (PUSCH) if the PUSCH is clean due to time division multiplexing (TDM) partitioning.

10. The method of claim 7, wherein managing interference comprises sending one or more beacon signals to trigger interference measurements from the interfering UE such that the UE is handed over to a different frequency by the neighbor base station.

11. The method of claim 7, wherein managing interference comprises:
    performing adaptive noise padding to protect uplink transmissions from interference.

12. The method of claim 1, further comprising sending an overload indication message to the neighbor BS.

13. The method of claim 1, further comprising sending a message to the neighbor BS that causes the neighbor BS to cause the interfering UE to at least one of transfer to another BS, reduce power or be scheduled differently.

14. A method for wireless communications by an apparatus, comprising:
    receiving semi-static system information from one or more neighboring base stations (BSs);
    based on the received information, identifying a neighbor BS whose user equipment (UE) causes interference in a physical uplink control channel (PUCCH) associated with the apparatus and identifying corresponding resources that are allocated to the interfering UE by the neighbor BS wherein identifying the neighbor BS that causes interference comprises comparing energy of an acknowledgment channel of a neighboring BS with a threshold; and transmitting information about the resources that are allocated to the interfering UE to the identified neighbor BS, wherein the transmitted information is used by the identified neighbor BS for managing interference.

15. An apparatus for wireless communications, comprising:

means for receiving semi-static system information from one or more neighboring base stations (BSs); and means for identifying, based on the received information, a neighbor BS whose user equipment (UE) causes interference in a physical uplink control channel (PUCCH) associated with the apparatus and identifying corresponding resources that are allocated to the interfering UE by the neighbor BS, wherein the means for identifying the neighbor BS that causes interference comprises means for comparing signal to noise ratio (SNR) of channel quality indicator (CQI) of a neighboring BS with a threshold; and means for transmitting information about the resources that are allocated to the interfering UE to the identified neighbor BS, wherein the transmitted information is used by the identified neighbor BS for managing interference.

16. The apparatus of claim 15, wherein the semi-static system information comprises system information block (SIB2) information that is received by listening to signals received in a network.

17. The apparatus of claim 16, wherein the semi-static system information comprises at least one of computer generated sequences (CGS) hopping configuration, PUCCH channel quality indicator (CQI) resource block (RB) region, PUCCH mixed acknowledgement (ACK)/CQI RB region, maximum number of users in PUCCH ACK RB, or cell sounding reference signal (SRS) configuration.

18. The apparatus of claim 15, wherein the semi-static system information comprises system information associated with PUCCH ACKs.

19. The apparatus of claim 15, wherein the semi-static system information comprises system information associated with a PUCCH CQI channel.

20. The apparatus of claim 15, wherein the semi-static system information is received over at least one of an X2 interface or fiber connection from the neighboring base stations.

21. The apparatus of claim 15, further comprising:

means for managing interference caused by the interfering UE.

22. The apparatus of claim 21, wherein the means for managing interference comprises:

means for scheduling a served UE in frequency division multiplexing (FDM) or time division multiplexing (TDM) to avoid interference.

23. The apparatus of claim 21, wherein the means for managing interference comprises:

means for assigning semi-persistent scheduling (SPS) such that one or more PUCCH are transmitted on physical uplink shared channel (PUSCH) if the PUSCH is clean due to time division multiplexing (TDM) partitioning.

24. The apparatus of claim 21, wherein the means for managing interference comprises: means for sending one or more beacon signals to trigger interference measurements from the interfering UE such that the UE is handed over to a different frequency by the neighbor base station.

25. The apparatus of claim 21, wherein the means for managing interference comprises:

means for performing adaptive noise padding to protect uplink transmissions from interference.

26. The apparatus of claim 15, further comprising means for sending an overload indication message to the neighbor BS.

27. The apparatus of claim 15, further comprising means for sending a message to the neighbor BS that causes the neighbor BS to cause the interfering UE to at least one of transfer to another BS, reduce power, or to be scheduled differently.

28. An apparatus for wireless communications, comprising:

means for receiving semi-static system information from one or more neighboring base stations (BSs); and means for identifying, based on the received information, a neighbor BS whose user equipment (UE) causes interference in a physical uplink control channel (PUCCH) associated with the apparatus and identifying corresponding resources that are allocated to the interfering UE by the neighbor BS, wherein identifying the neighbor BS that causes interference comprises:

means for comparing energy of an acknowledgment channel of a neighboring BS with a threshold; and means for transmitting information about the resources that are allocated to the interfering UE to the identified neighbor BS, wherein the transmitted information is used by the identified neighbor BS for managing interference.

29. An apparatus for wireless communications, comprising:

at least one processor configured to receive semi-static system information from one or more neighboring base stations (BSs) and, based on the received information, identify a neighbor BS whose user equipment (UE) causes interference in a physical uplink control channel (PUCCH) associated with the apparatus and identifying corresponding resources that are allocated to the interfering user equipment (UE) by the neighbor BS, wherein identifying the neighbor BS that causes interference comprises comparing signal to noise ratio (SNR) of channel quality indicator (CQI) of a neighboring BS with a threshold, and transmitting information about the resources that are allocated to the interfering UE to the identified neighbor BS, wherein the transmitted information is used by the identified neighbor BS for managing interference; and a memory coupled with the at least one processor.

30. A computer program product for wireless communications by an apparatus comprising a non-transitory computer readable medium having instructions stored thereon, the instructions executable by one or more processors for:

receiving semi-static system information from one or more neighboring base stations (BSs); and based on the received information, identifying a neighbor BS whose user equipment (UE) causes interference in a physical uplink control channel (PUCCH) associated with the apparatus and identifying corresponding resources that are allocated to an interfering UE by the neighbor BS, wherein identifying the neighbor BS that causes interference comprises comparing signal to noise ratio (SNR) of channel quality indicator (CQI) of a neighboring BS with a threshold; and transmitting information about the resources that are allocated to the interfering UE to the identified neighbor BS, wherein the transmitted information is used by the identified neighbor BS for managing interference.

* * * * *